United States Patent
Vasseur et al.

(10) Patent No.: US 11,463,365 B1
(45) Date of Patent: Oct. 4, 2022

(54) PREEMPTING TIME-BASED SLA VIOLATIONS IN COMPUTER NETWORKS

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/150,525

(22) Filed: Jan. 15, 2021

(51) Int. Cl.
*H04L 47/2425* (2022.01)
*H04L 47/122* (2022.01)
*H04L 12/46* (2006.01)
*H04L 43/0864* (2022.01)
*H04L 43/087* (2022.01)
*H04L 43/0852* (2022.01)
*H04L 45/00* (2022.01)

(52) U.S. Cl.
CPC ...... *H04L 47/2425* (2013.01); *H04L 12/4633* (2013.01); *H04L 43/087* (2013.01); *H04L 43/0852* (2013.01); *H04L 43/0864* (2013.01); *H04L 45/22* (2013.01); *H04L 47/122* (2013.01)

(58) Field of Classification Search
CPC . H04L 47/2425; H04L 47/122; H04L 47/127; H04L 43/0864; H04L 43/087; H04L 12/4633; H04L 43/0852; H04L 45/22
See application file for complete search history.

(56) References Cited

U.S. PATENT DOCUMENTS

| | | | | |
|---|---|---|---|---|
| 8,209,273 | B2 * | 6/2012 | Gohs | G06Q 10/06 706/21 |
| 9,794,145 | B2 | 10/2017 | Vasseur et al. | |
| 10,289,973 | B2 | 5/2019 | Feller et al. | |
| 10,956,849 | B2 * | 3/2021 | Wu | H04L 41/5009 |
| 2003/0208523 | A1 * | 11/2003 | Gopalan | H04L 41/5009 709/224 |
| 2013/0311673 | A1 * | 11/2013 | Karthikeyan | H04L 45/42 709/239 |

(Continued)

OTHER PUBLICATIONS

Truong, et al., "Selective Review of Offline Change Point Detection Methods", online: https://arxiv.org/pdf/1801.00718.pdf, Mar. 2020, 58 pages, arXiv.org.

(Continued)

*Primary Examiner* — Nam T Tran
(74) *Attorney, Agent, or Firm* — Behmke Innovation Group LLC; Kenneth J. Heywood; Jonathon P. Western

(57) ABSTRACT

In one embodiment, a device identifies a sudden change in a time series of a quality of service metric for a first path in a network that violates a service level agreement threshold associated with application traffic conveyed via the first path. The device predicts a length of time that the sudden change in the time series will last. The device determines, based in part on the length of time that the sudden change in the time series is predicted to last, that the application traffic should be rerouted onto a second path in the network. The device causes the application traffic to be rerouted onto the second path in the network.

20 Claims, 13 Drawing Sheets

(56) References Cited

U.S. PATENT DOCUMENTS

| | | | | |
|---|---|---|---|---|
| 2015/0333953 | A1* | 11/2015 | Vasseur | H04L 47/127 |
| | | | | 370/228 |
| 2016/0028616 | A1* | 1/2016 | Vasseur | H04L 47/50 |
| | | | | 370/412 |
| 2018/0352025 | A1* | 12/2018 | Anya | H04L 41/5009 |
| 2019/0036808 | A1* | 1/2019 | Shenoy | H04L 41/5009 |
| 2020/0167258 | A1 | 5/2020 | Chattopadhyay et al. | |
| 2020/0313979 | A1 | 10/2020 | Kumaran et al. | |
| 2020/0389390 | A1 | 12/2020 | Vasseur et al. | |
| 2021/0168125 | A1* | 6/2021 | Vemulpali | H04L 61/2007 |

OTHER PUBLICATIONS

Agarwal, Saurav, "An Approach of SLA Violation Prediction and QoS Optimization using Regression Machine Learning Techniques", Jul. 2020, 93 pages, Electronic Theses and Dissertations, University of Windsor, Canada.

* cited by examiner

… (US 11,463,365 B1)

PREEMPTING TIME-BASED SLA VIOLATIONS IN COMPUTER NETWORKS

TECHNICAL FIELD

The present disclosure relates generally to computer networks, and, more particularly, to preempting time-based service level agreement (SLA) violations in computer networks.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

In SD-WANs. packets are routed on a secondary path if the existing path fails to meet the SLA of the traffic and provides inadequate QoS. For instance, one SLA for voice traffic may specify the following: latency≤150 ms, loss≤3%, and jitter≤30 ms. In such cases, packets are routed to a new path that is presumed to satisfy the SLA. However, the alternative path may violate the SLA soon after the traffic is rerouted. Traditionally, the QoS of the alternative path will be observed for a period of time, before the alternative path is also deemed as violating the SLA of the traffic. For instance, current SD-WAN implementations compute a running mean of loss, latency, and jitter for ten minutes, and will declare an SLA failure on a path only when six such running means indicate SLA violation. This leads to a delay of one hour before declaring an SLA violation on the new path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
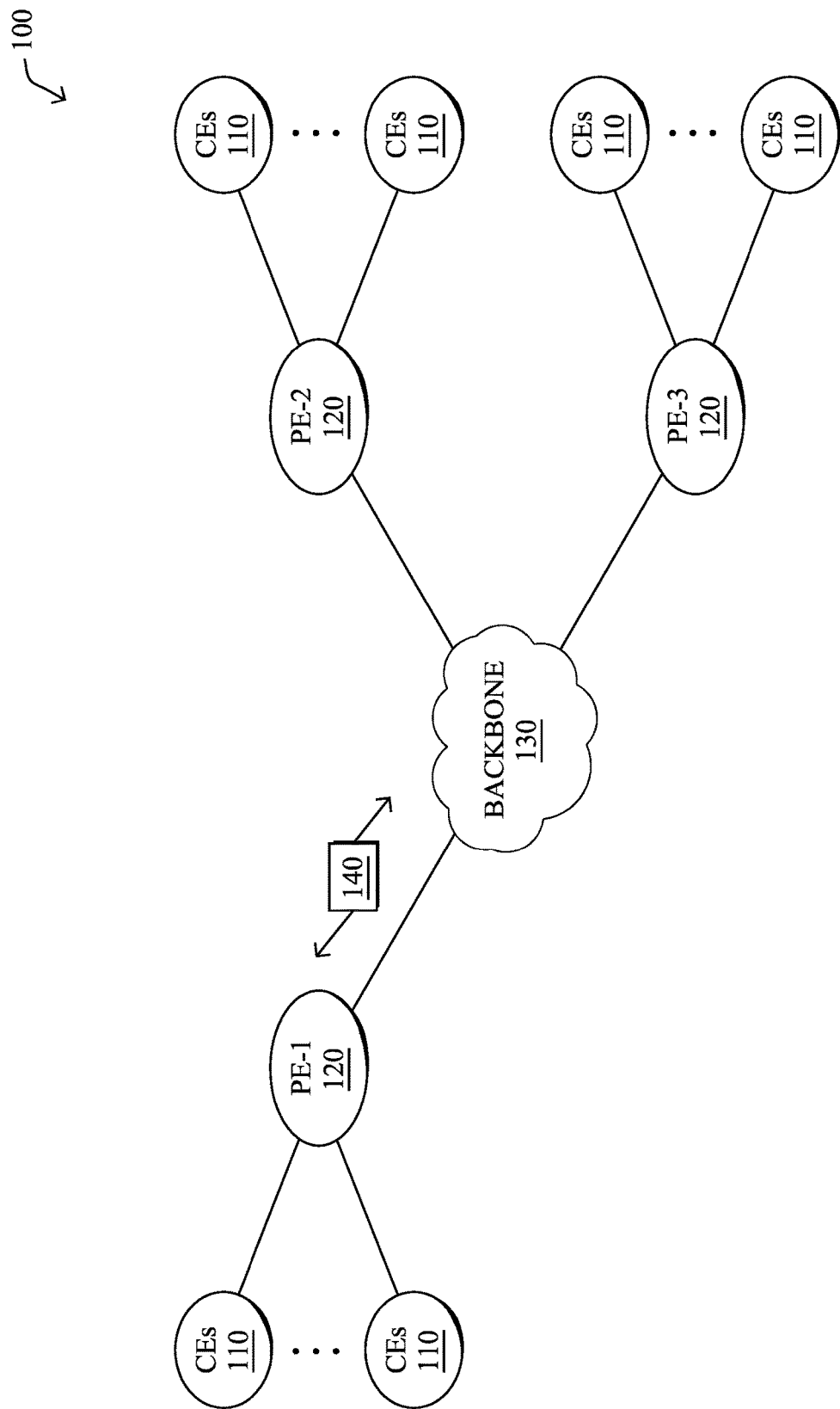
FIGS. 1A-1B illustrate an example communication network.

According to one or more embodiments of the disclosure, a device identifies a sudden change in a time series of a quality of service metric for a first path in a network that violates a service level agreement threshold associated with application traffic conveyed via the first path. The device predicts a length of time that the sudden change in the time series will last. The device determines, based in part on the length of time that the sudden change in the time series is predicted to last, that the application traffic should be rerouted onto a second path in the network. The device causes the application traffic to be rerouted onto the second path in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
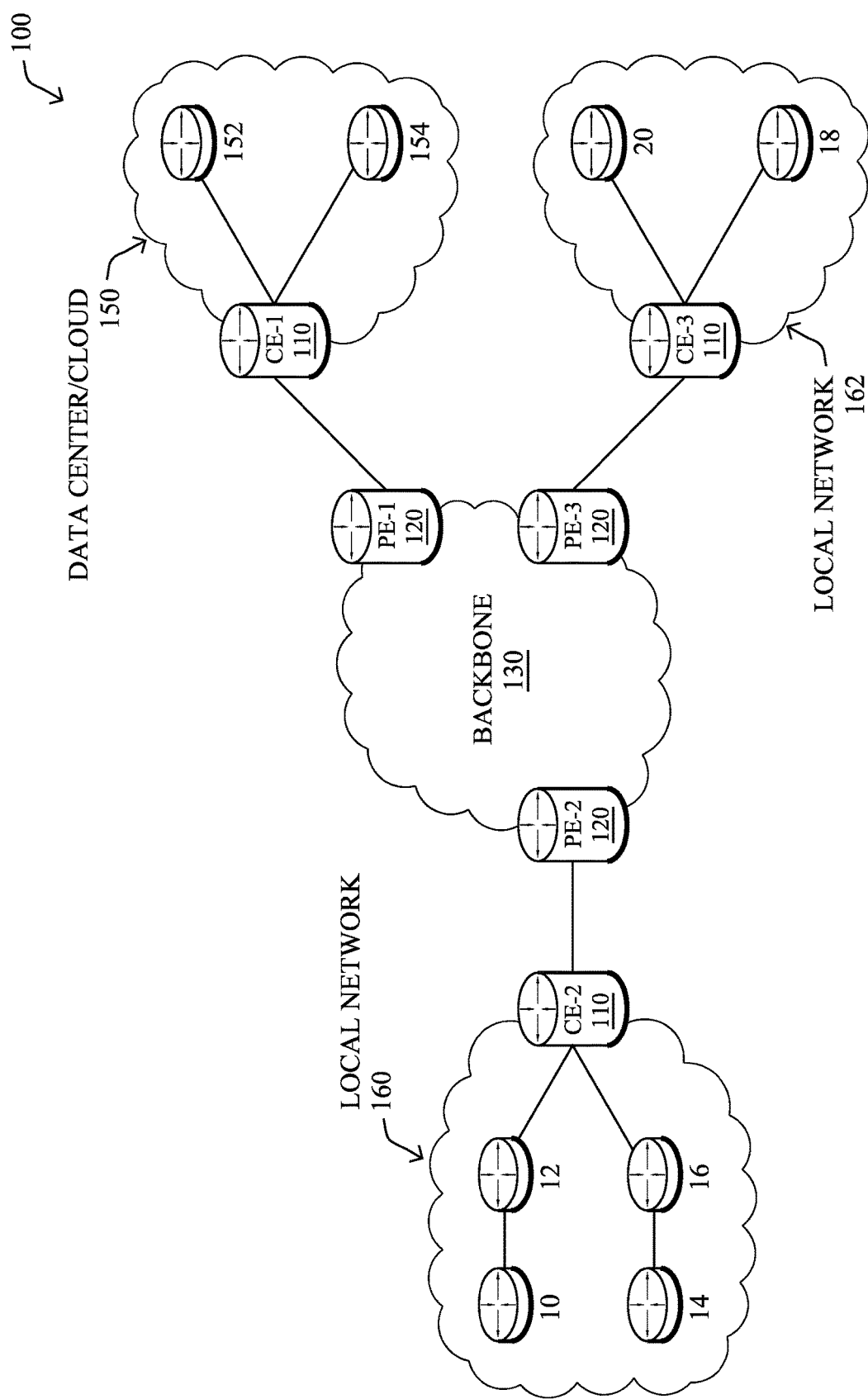

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
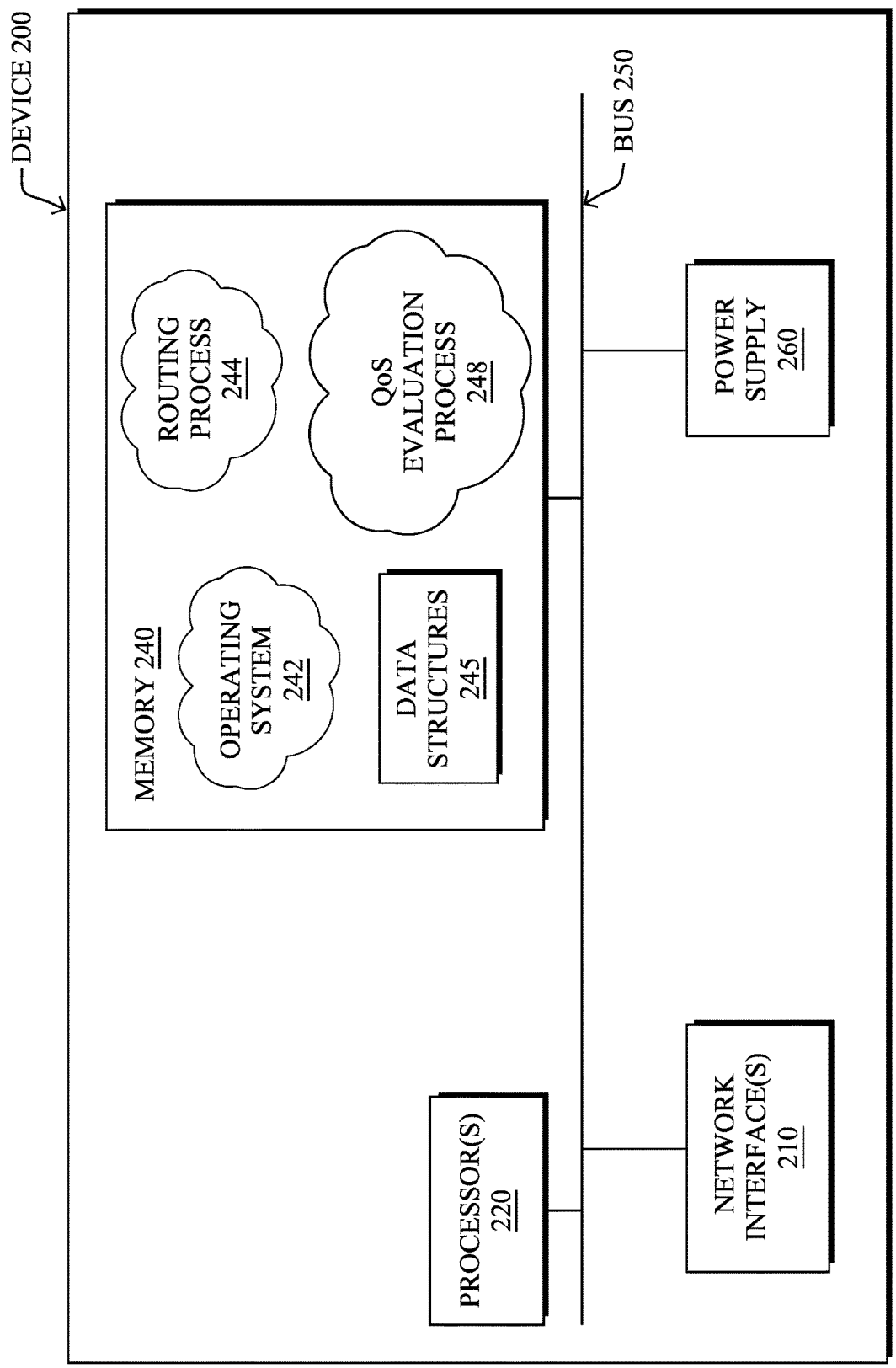
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a quality of service (QoS) evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or QoS evaluation process 248 may also include computer executable instructions that, when executed by processor(s) 220, cause device 200 to perform the techniques described herein. To do so, in some embodiments, routing process 244 and/or QoS evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or QoS evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable QoS or an unacceptable QoS. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or QoS evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that QoS of a particular network path will not satisfy the service level agreement (SLA) of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
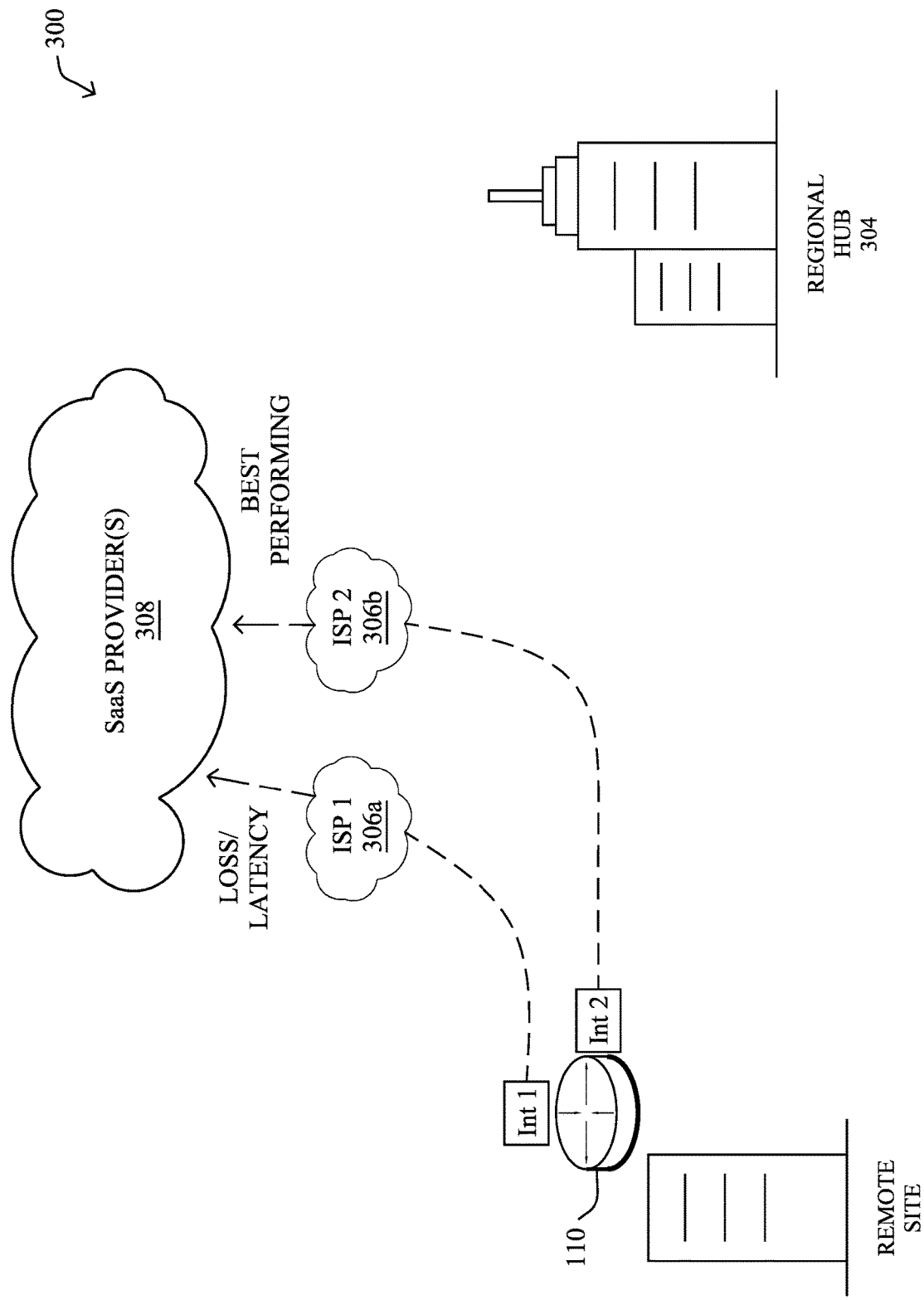
FIGS. 3A-3B illustrate example network deployments.
Figure 3B:
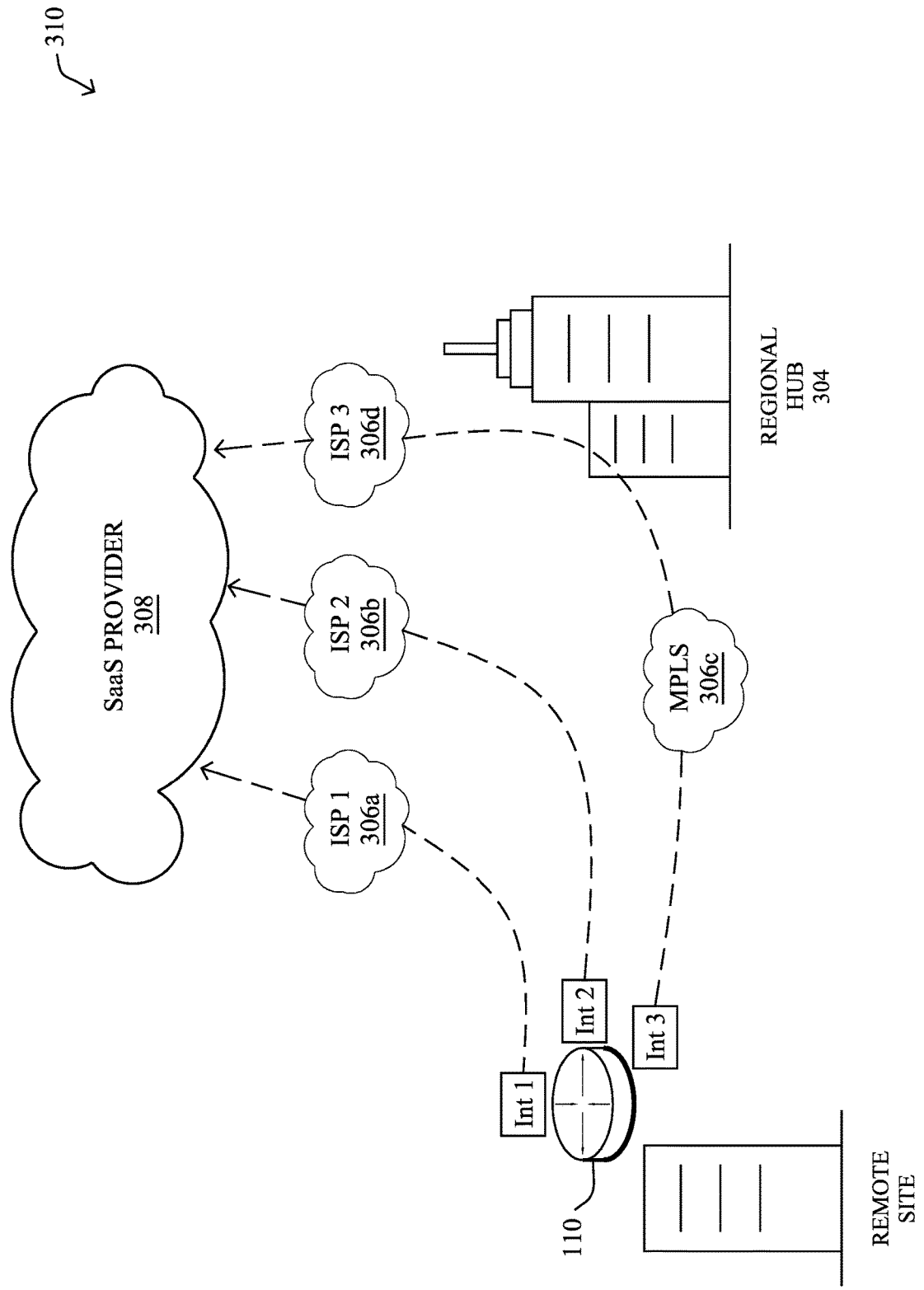

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL. 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
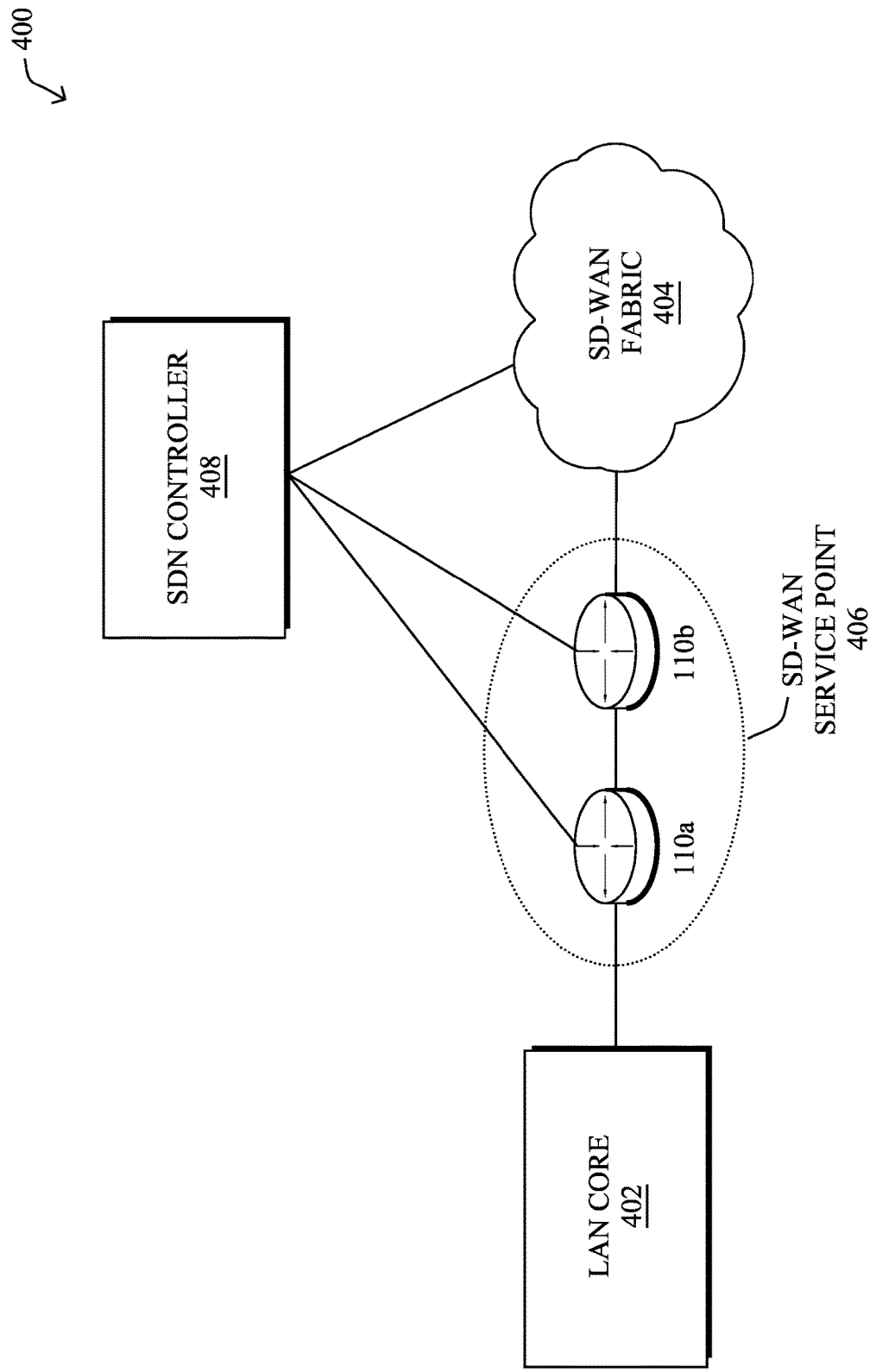
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
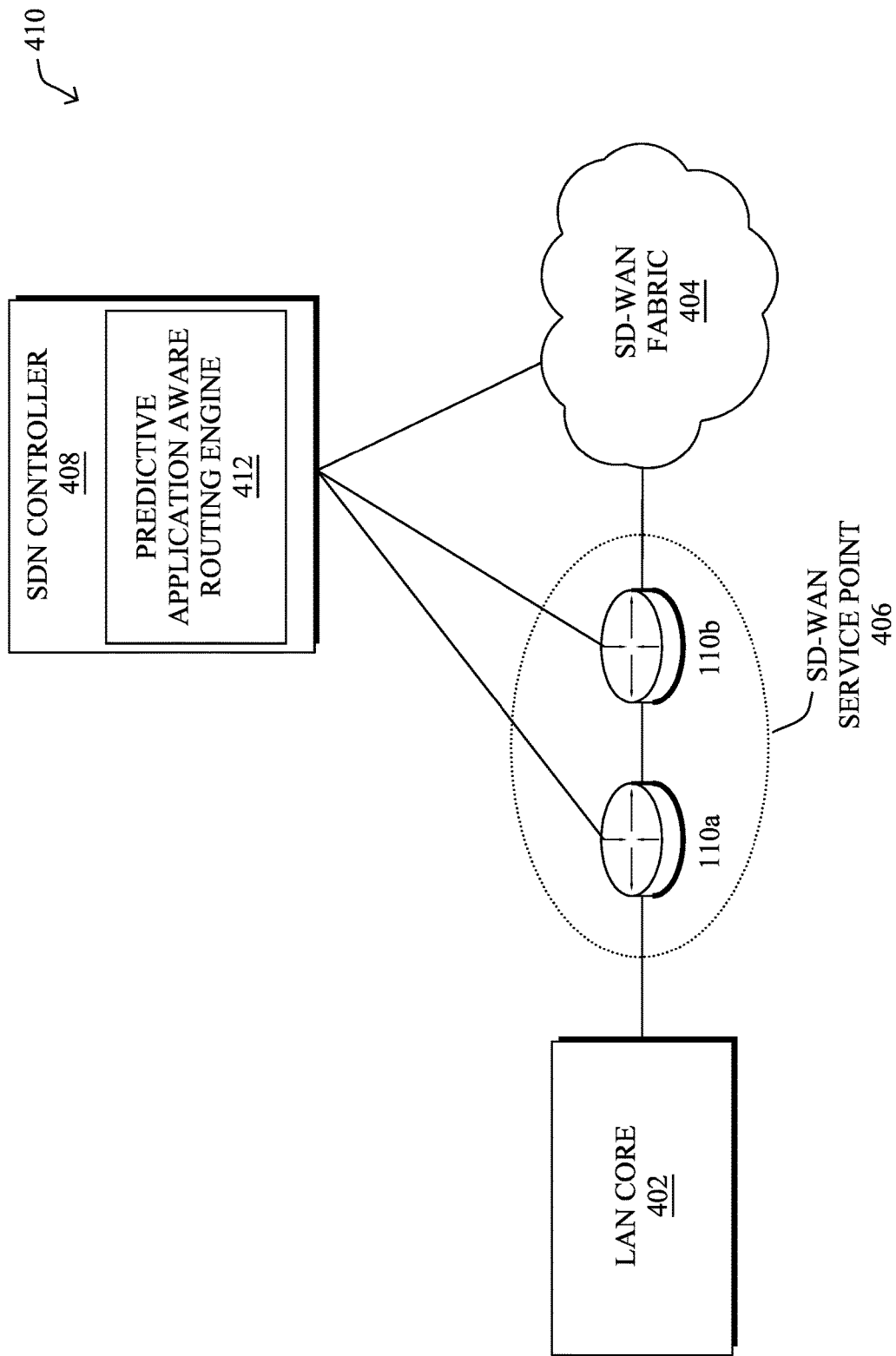

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of process 244 and/or process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

During execution, predictive application aware routing engine 412 identify trend changes in the network KPIs of a path by utilizing several probes that measure path health (e.g., loss, latency and jitter). In turn, the predictive routing engine utilizes statistical and/or machine learning techniques to predict such path deterioration in the future (e.g., predict SLA violations) and generate routing "patches" (e.g., policies) that proactively reroute application traffic before an SLA violation occurs.

One of the main challenges of predictive routing lies in the ability to accurately perform predictions of SLA violations. Generally speaking, the SLA violation predictions should be made with high recall, for the solution to be effective. However, recall is not the only consideration. Indeed, in some instances, it might also be acceptable not to predict an SLA violation and fall back to a reactive routing approach whereby SLAs are checked thanks to probing and the traffic is rerouted only when an actual SLA violation is detected.

Precision represents another performance metric for the SLA violation predictions, which can be particularly critical in situations in which the number of total positive examples is low (e.g., are rare events). Indeed, even a small number of false positives can strongly affect the precision, when the number of true positives is low. Furthermore, the traffic may be unnecessarily rerouted onto a path that may eventually not meet the SLA. In some embodiments, this can be mitigated against by also forecasting whether the new path will violate the SLA. However, rerouting traffic onto the new path will unavoidably change the conditions, including in ways that could cause the SLA to be violated. This can be doubly problematic in situations in which the original path does not exhibit the predicted SLA violation, meaning that the predictive reroute actually made things worse.

As noted above, packets are routed on a secondary path if the existing path fails to meet the SLA of the traffic and provides inadequate QoS. For instance, one SLA for voice traffic may specify the following: latency≤150 ms, loss≤3%, and jitter≤30 ms. In such cases, packets are routed to a new path that is presumed to satisfy the SLA. However, this can also lead to the routing protocol causing the traffic to oscillate between multiple paths. This can happen, for instance, if the chosen new path after switchover turns out to provide inferior performance than other alternative paths or the original path is again eligible to carry the traffic (e.g., its performance would again satisfy the SLA of the traffic).

More specifically, the traditional approach to ensuring that the network satisfies the SLA of traffic is to monitor the current path for SLA compliance and switch the traffic to a different path, if its SLA is not satisfied. Usually, verification timers are used in conjunction with a path switchover. For example, while the packets are conveyed via the new path, the performance of the new path may also be examined for a certain amount of time (e.g., one hour), to ensure that the new path is able to satisfy the SLA. If the new path is unable to satisfy the SLA, the traffic may be switched again. In the interim, however, this means that the path will provide unsatisfactory performance to the application traffic that it conveys.

Preempting Time-Based SLA Violations in Computer Networks

The techniques introduced herein provide for the ability to detect abrupt changes in the application quality (e.g., as represented by SLA violations or applications labels) using statistical and/or machine learning modeling. In some aspects, the techniques herein allow for the immediate rerouting of traffic, when such an abrupt change is detected. In further aspects, the techniques herein also allow for the prediction that a particular path is susceptible to abrupt changes in its performance. The system may use these predictions to preemptively block reroutes onto that path.

Illustratively, the techniques described herein may be performed by hardware, software, and/or firmware, such as in accordance with QoS evaluation process 248, which may include computer executable instructions executed by the processor 220 (or independent processor of interfaces 210) to perform functions relating to the techniques described herein (e.g., in conjunction with routing process 244).

Specifically, according to various embodiments, a device identifies a sudden change in a time series of a quality of service metric for a first path in a network that violates a service level agreement threshold associated with application traffic conveyed via the first path. The device predicts a length of time that the sudden change in the time series will last. The device determines, based in part on the length of time that the sudden change in the time series is predicted to last, that the application traffic should be rerouted onto a second path in the network. The device causes the application traffic to be rerouted onto the second path in the network.

Figure 5:
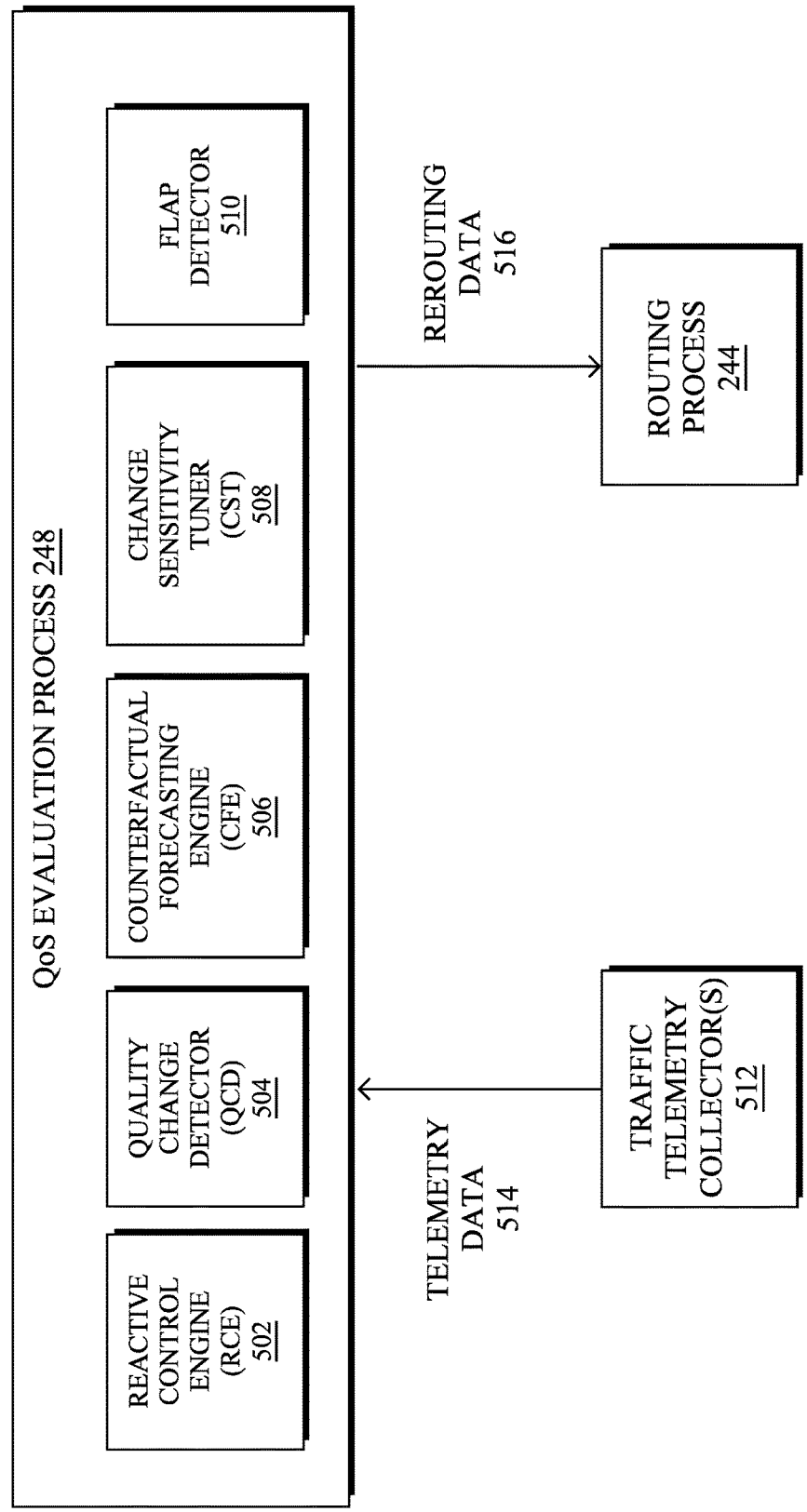
FIG. 5 illustrates an example architecture for evaluating the Quality of Service (QoS) along a network path.

Operationally, FIG. 5 illustrates an example architecture 500 for evaluating and predicting the QoS offered by one or more paths in a network, according to various embodiments. At the core of architecture 500 is QoS evaluation process 248, which may be executed by a supervisory device of a network or another device in communication therewith. For instance, QoS evaluation process 248 may be executed by an SDN controller (e.g., SDN controller 408 in FIG. 4), a particular networking device in the network (e.g., a router, etc.), or another device in communication therewith. As shown, QoS evaluation process 248 may include any or all of the following components: a reactive control engine 502, a quality change detector 504, a counterfactual forecasting engine 506, a change sensitivity tuner 508, and/or a flap detector 510. As would be appreciated, the functionalities of these components may be combined or omitted, as desired. In addition, these components may be implemented on a singular device or in a distributed manner, in which case the combination of executing devices can be viewed as their own singular device for purposes of executing QoS evaluation process 248.

During execution, QoS evaluation process 248 may receive telemetry data 514 from any number of traffic telemetry collectors 512 for the network path(s) under scrutiny. For instance, telemetry data 514 may comprise NetFlow records, IPFIX records, path probing results, such as from Bidirectional Forwarding Detection (BFD) probing, or other telemetry data indicative of the performance of a particular path (e.g., in terms of delay, jitter, packet loss, etc.). Telemetry data 514 may also include application-specific information regarding the various applications whose traffic is conveyed by a particular path in the network.

In various embodiments, one component of QoS evaluation process 248 may be reactive control engine (RCE) 502 that takes as input telemetry data 514 from the network. In general, RCE 502 may use telemetry data 514 to perform any or all of the following: 1.) inspecting the QoS metrics (loss, latency, jitter) of the path(s) under scrutiny, 2.) detecting any SLA violations on existing routes by examining the route for a period of time $T_{default}$, and/or 3.) re-routing the traffic to some other alternative path which currently does not violate SLA. For instance, if RCE 502 determines that path A violates the SLA of voice traffic that is conveyed via path A, RCE 502 may issue rerouting data 516 to routing process 244, to initiate rerouting of the voice traffic onto path B in the network.

In some instances, RCE 502 may be configured to leverage a timer-based heuristic to detect SLA violations on the new path, after it initiates rerouting of application traffic onto that path. For instance. RCE 502 may assess the results of BFD probes along the new path and compute a mean of the resulting QoS metric(s) every n-number of minutes. In turn, if x-number of computed QoS means violate the SLA of the traffic, RCE 502 may initiate another rerouting of the application traffic to a different path (e.g., tunnel). However, this form of reactive approach is relatively slow and requires n-times-x amount of time, to determine that the application traffic should be rerouted away from its new path.

According to various embodiments, one or more user-definable parameters may control whether QoS evaluation process 248 uses the (slow) reactive approach of RCE 502 for a particular application type or path, or uses the sudden change detection approach introduced herein. Indeed, while the techniques herein allow for the detection of sudden QoS changes along a path and the immediate rerouting of its traffic, doing so is also slightly more costly in terms of resources. Thus, it may be preferable to limit using the latter approach to application traffic that is highly sensitive to SLA violations and cannot tolerate the expiration of the monitoring period before rerouting. To this end, QoS evaluation process 248 may signal to the edge device(s) the set of applications that are eligible to use the sudden change-based rerouting mechanism introduced herein. For instance, this signaling may take the form of a unicast or multicast message that identifies the application ID(s) for the application recognition engines of the edge device(s), such as Network Based Application Recognition (NBAR) by Cisco System, Inc., or the like.

Another potential component of QoS evaluation process 248 may be quality change detector (QCD) 504, which is responsible for detecting sudden changes in application quality degradation from telemetry data 514. QCD 504 may measure the degradation, for instance, based on any SLA violation(s) of a path or by application experience labels, as indicated by telemetry data 514. For instance, a videoconferencing application may be labeled as 'good,' 'bad,' or 'no decision,' based on the video and/or audio quality experienced at the end devices.

Figure 6:
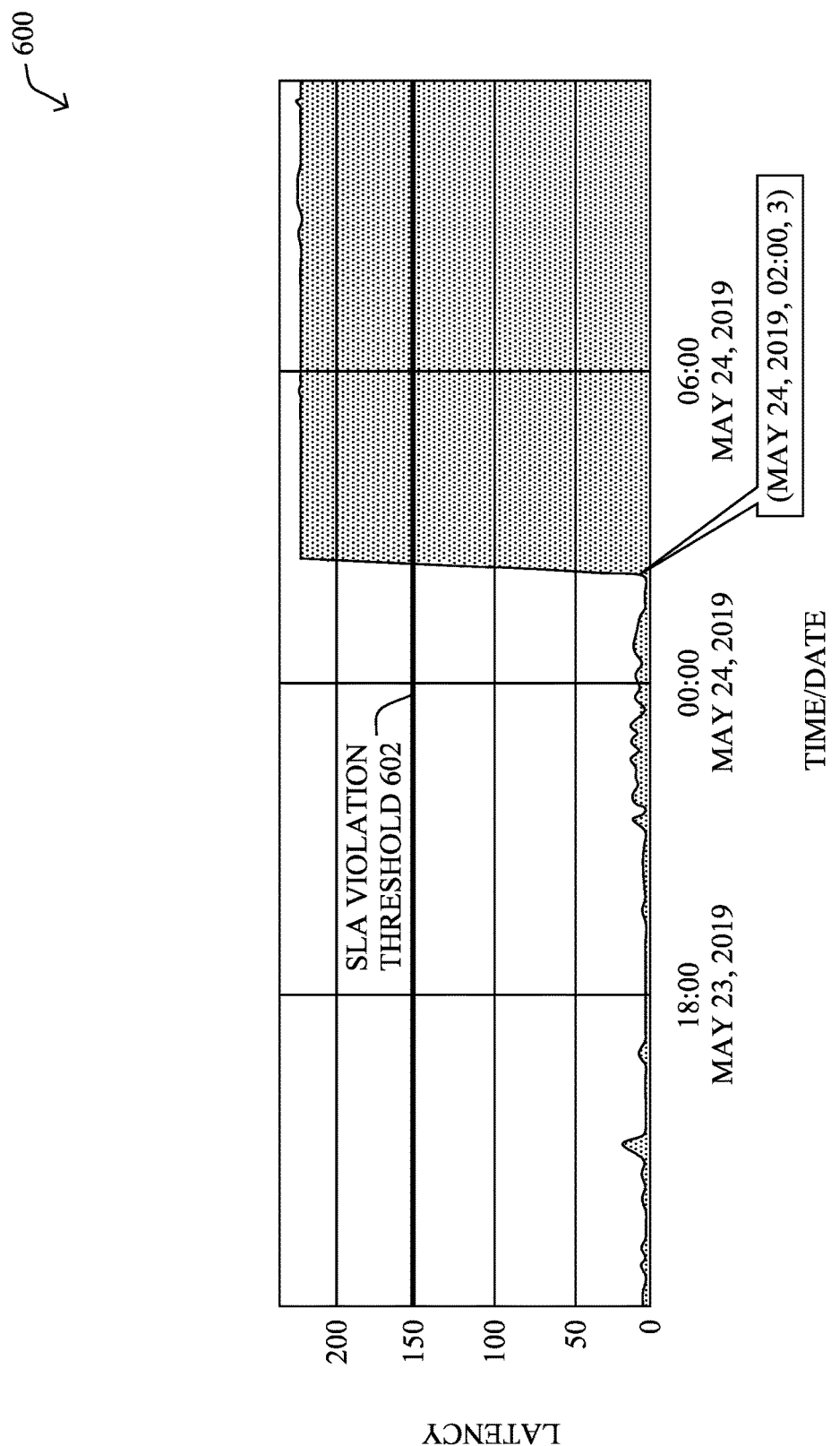
FIG. 6 illustrates an example plot of path latency over time.

FIG. 6 illustrates an example plot 600 of the latency along a path between neighboring cities over time, according to various embodiment. As shown, the latency is usually low, remaining around approximately 10 ms. However, at 2:00 PM on May 24, 2019, the latency suddenly spikes to approximately 220 ms. This causes an SLA violation for voice traffic, assuming an SLA threshold of 150 ms and represents the type of sudden QoS changes that QCD 504 may detect.

Referring again to FIG. 5, QCD 504 may actively monitor the application traffic routed over the path(s) and the path QoS metrics. In one embodiment, the QoS metrics of a path $P_i$ are represented as a timeseries: loss($P_i$, t), latency($P_i$, t) and jitter($P_i$, t). For each application $A_i$ on the path, QCD 504 may detect any drastic changes in loss, latency, and/or jitter beyond the SLA violation thresholds. To this end, QCD 504 may leverage a cumulative sum (CUSUM) or other change point detection algorithm, to check for drastic changes in the QoS of the path. Generally, these types of algorithms detect points of abrupt changes in timeseries, such as sudden spikes or dips.

Let the timeseries of the QoS metric be represented as y(t). In one implementation, QCD 504 may first search possible change-points by moving over a sliding window of t timesteps. For every window w=[t1, t2], QCD 504 may then compute a cost function of the timeseries for that window. For instance, an example cost function c(w) may be the empirical mean of y(t) for t=[t1, t2]. Another example cost function may be the distribution of y(t) over the window, such as its cumulative distribution function (CDF). Over neighboring windows w1 and w2, QCD 504 may compare the cost functions using an appropriate cost differencing function (e.g., cdiff(w1, w2)=c(w2)−c(w1)). Based on the variation of costs over different time-windows, QCD 504 may segment the timeseries into different time-segments T={(t1, t2), (t2, t3), (t3, t4), . . . } such that the cost of the timeseries in a given segment is similar. Then, QCD 504 may prune and rank the change points based on the amount of change. Finally. QCD 504 may returns a set of 'change-points' in time where there was a significant change in the cost functions over neighboring windows for the QoS metric. QCD 504 may also use additional constraints, to check whether the change point in-fact resulted in an SLA violation, the extent of the change, etc.

In another embodiment, QCD 504 may use a peak detection algorithm, to check whether there are any significant changes with respect to SLA violations. For instance, QCD 504 may take as input the QoS time series and certain parameters, such as minimum peak height and minimum peak-width (time-period of the peak). In turn, QCD 504 may assess any peaks exhibited by the time series.

Figure 7:
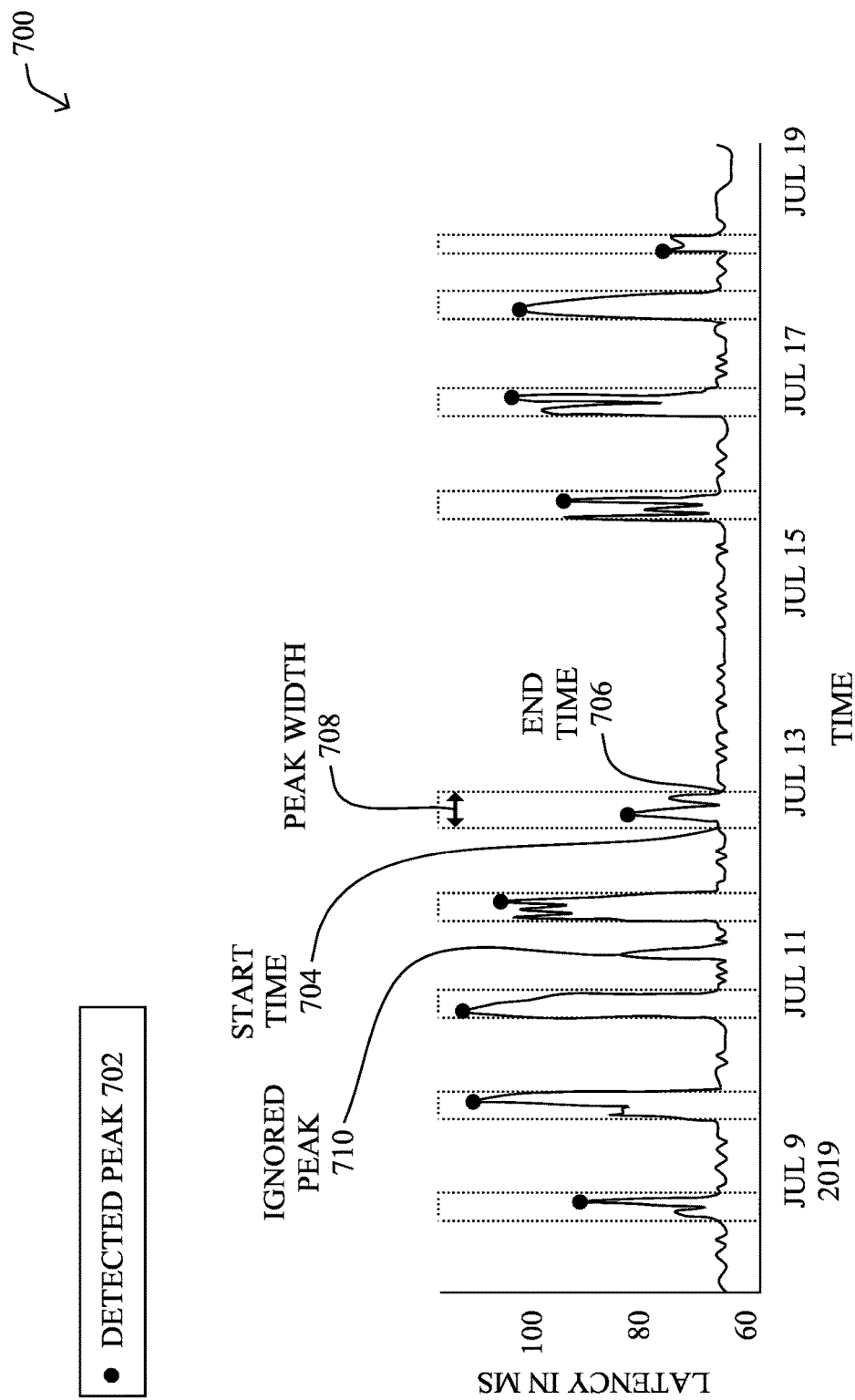
FIG. 7 illustrates an example QoS time series.

FIG. 7 illustrates an example time series 700 showing the measured latency of a path over time. To detect the peaks 702 in time series 700. QCD 504 may take as input the following parameters:

Minimum Peak Height: This is the minimum height of the peak from the base value to mark the point as a peak. For each QoS metric, a value can be set such that it represents a significant jump. For example, peak height for latency may be 10 ms, meaning that there must be a jump of at least 10 ms in the latency, for there to be a peak. In the case of loss, an example minimum peak height may be set to 1%.

Peak Width: This parameter helps in ignoring noisy peaks that occur over very short time intervals. This specifies the minimum and maximum time-interval of the peak to be discovered.

Accordingly, QCD 504 may use the above parameters with its peak detection algorithm, to detect peaks 702 in time series 700. As would be appreciated, each peak 702 may be required to at least meet the minimum peak height specified. Thus, some peaks, such as peak 710, may be 'ignored' and not included in detected peaks 702, because its peak height falls below the minimum peak height parameter. In addition, QCD 504 may also ensure that each detected peak 702 exhibits a minimum peak width. For instance, peak width 708 shown may represent the difference between the start time 704 for the peak 702 and its end time 704. If peak width 708 falls below the specified peak width parameter, QCD 504 may likewise ignore that peak.

Referring again to FIG. 5, QCD 504 may notify RCE 502 of any abrupt changes in the QoS metrics. In turn, RCE 502 may decide to check for another alternative path to reroute the traffic. If so, RCE 502 may then send rerouting data 516 to routing process 244, to initiate the reroute.

In some embodiments, QoS evaluation process 248 may also include counterfactual forecasting engine (CFE) 506 that is responsible for forecasting the traffic on a path in the near future and predict whether the new path PA will violate the SLA under the predicted load. To do so, CFE 506 may monitor the amount of incoming traffic for several applications on a given path (or ingress to an edge router), and predict whether such a load will result in SLA violations. In one embodiment, CFE 506 may operate in conjunction with QCD 504 and/or RCE 502, to recommend reroutes to routing process 244. For instance. QCD 504 or CFE 506 may block a reroute onto a certain path, if it predicts that rerouting application traffic onto that path will result in an SLA violation. In other embodiments, CFE 506 may only be called if all other alternative paths were not recommended by RCE 502.

QoS evaluation process 248 may also include change sensitivity tuner (CST) 508, in some embodiments, that is responsible for monitoring and tuning the parameters of QCD 504 so that it is not too sensitive to sudden QoS changes in the path. To do so, CST 508 may tune the parameters of QCD 504 based on several change phenomenon, such as the time-interval where the abrupt change persists.

In one embodiment, QCD 504 may analyze each path P, in an offline manner, to observe the amount of time that SLA is violated, upon detection of an abrupt change to the QoS. This can be computed by running the change-point detection algorithm with varying window-sizes (w), and then picking the right window size where change point indicates that the time-segment for the current change is beyond a certain amount of time (e.g., 10 minutes, etc.). This is straightforward since timeseries change-point detection algorithms currently support choosing such optimal window sizes. Similarly, optimal peak-widths and peak-heights can also be chosen for every path P offline, if QCD 504 uses peak-detection. QCD 504 can then choose the optimal window-size or peak-width to make sure that it detects abrupt-changes that lasts significantly longer. In another embodiment, a global set of peak width or window-size can be chosen by observing the distribution of the abrupt-change points across all paths.

CST 508 may then build a probabilistic model for every path P that predicts the amount of time that the abrupt-change will last ($T_P$). For example, CST 508 may compute the distribution $T_P$ from the empirical time-periods of changes observed of SLA violations, when QCD 504 detects a change. Once CST 508 has learned this distribution, CST 508 may compute the waiting time to declare abrupt change (Wait$_P$) and adjust QCD 504, accordingly.

Figure 8A:
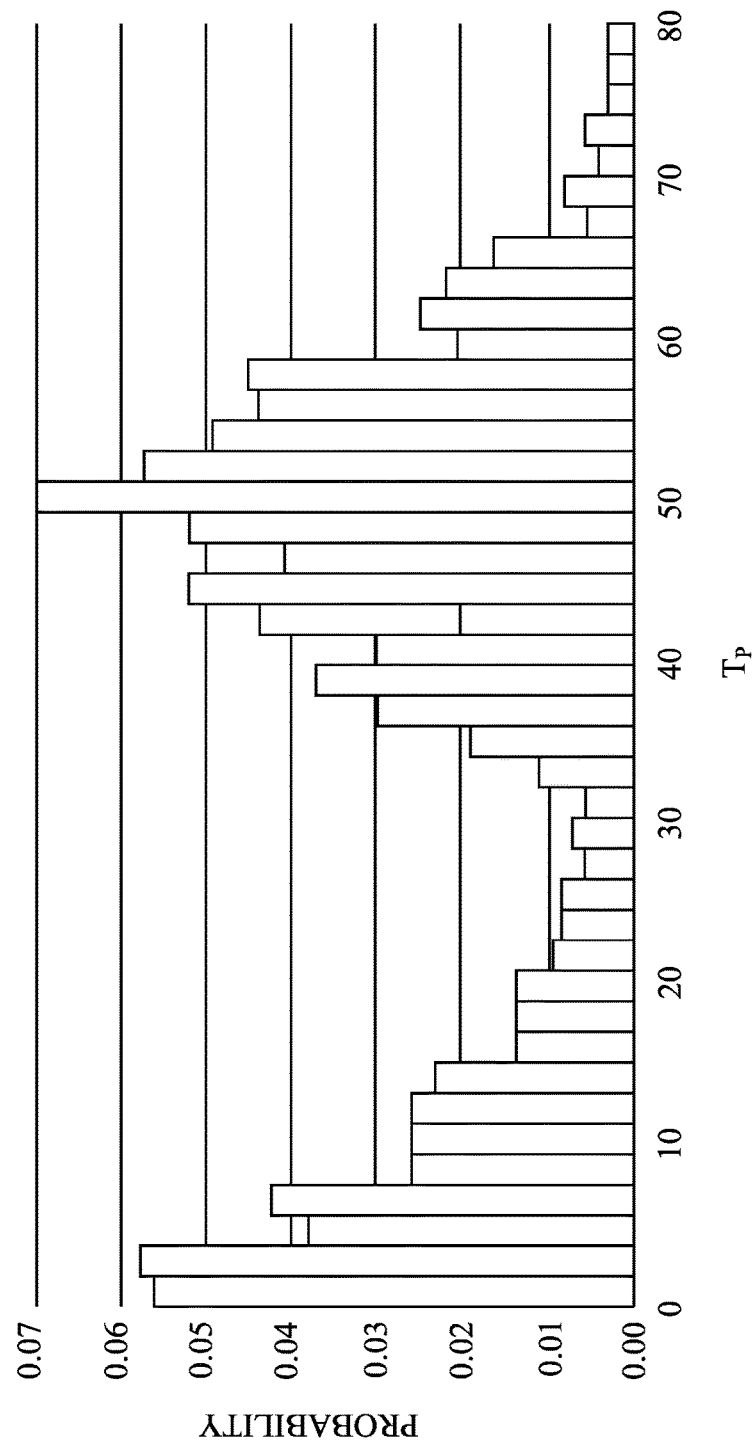
FIGS. 8A-8B illustrate example plots of QoS probabilities.
Figure 8B:
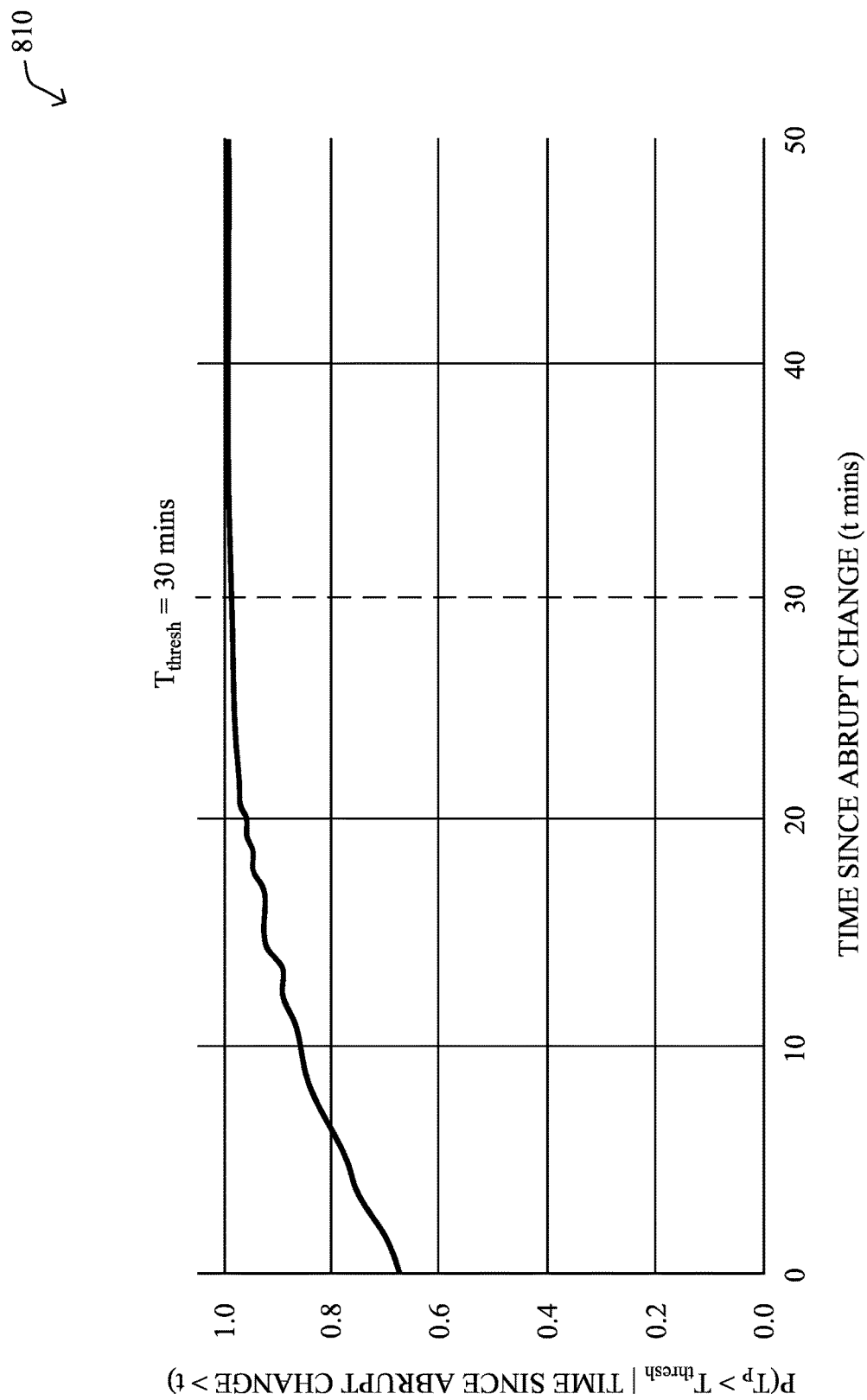

By way of example, FIG. 8A illustrates an example graph 800 showing the distribution of $T_P$ for a given path P. FIG. 8B illustrates an example plot 810 of the conditional probability (y-axis) that the current observed change will last for greater than some threshold $T_{thresh}$ (e.g., 30 minutes, etc.) given that t-minutes have elapsed since the current change was detected. This may be base, for instance, on certain statistical assumptions such as the time durations of changes are independent. For instance, CST 508 may compute this conditional probability as follows:

$$P(T_{p \geq T_{thresh}} \mid \text{time since current abrupt change} > t) =$$
$$\min\left(1.0, \frac{\text{\# samples where } T_p \geq T_{thresh}}{\text{\# samples where } T_p > \text{time since change}}\right)$$

This can be seen on the right-hand side of plot 810 where the x-axis is the time since the abrupt change occurred and the y-axis is the above conditional probability. In turn, CST 508 may select a threshold, $T_{thresh}$, based on the conditional probability. For instance, if the system can tolerate 10% false alarms, this threshold can be selected by identifying the time on the x-axis at which 90% on the y-axis intersects plot 810.

In further embodiments, CST 508 may determine the waiting time for QCD 504 to declare a disruption by assessing percentiles on the observed distribution. In other embodiment, CST 508 may build a regression or other prediction model to predict $T_P$. The features of such a model may include contextual features, such as traffic on the path and alternative paths until time t and time-of-the-day. CST 508 may also retrain the model periodically (e.g., once per week) or on demand. Similar methods can be employed to detect other sensitivity parameters such as peak-height.

In yet another embodiment, CST 508 may tune the parameters of QCD 504 based on the historical data of how often the abrupt-change lasted. Here, the output of QCD 504 may be determined using the offline-tuned parameters from CST 508, as above. However, the path P may continue to be monitored after QCD 504 triggers a reroute. In such a case, CST 508 may assess telemetry data 514 to determine the time-interval of abrupt-change $T_P$ of the path P. In turn, CST 508 may tag the output of QCD 504 as "good" if the QoS change lasts for a longer time than predicted (e.g., more than 75% of predicted $T_P$). Otherwise, CST 508 may tag the output of QCD 504 as "bad." These tags can be used to measure the quality of CST 508. If, for a certain path, the quality of CST 508 degrades (e.g., there are more "bad" labels than "good"), this may trigger CST 508 to retrain its model for $T_P$. If the path P continues to exhibit "bad" predictions, even after model retraining, then QCD 504 may cease announcing abrupt-changes on the path P and/or issue an alert to a user.

QoS evaluation process 248 may further include a flap detector 510 which is responsible for detecting how often a path switches/flaps between states of violating the SLA and not violating the SLA. Flap detector 510 may, for instance, detect how often the abrupt-changes flap for each path P. For example, if the path observes frequent SLA violation lasting several few minutes, and the path exhibits no SLA for the next few minutes after that, and this pattern repeats, flap detector 510 may tag that path as flapping between SLA violations. To detect frequent flapping for a particular path, flap detector 510 may build a statistical or machine learning model that predicts such behavior. For example, flap detector 510 may measure the rate of flapping between SLA violations and non-SLA violations, based on telemetry data 514. Note that such rate of flaps for a path can be easily learned by statistical or machine learning models by observing the empirical distribution of rate-of-flaps in the history. If the rate of flap is greater than a certain threshold (say, more than 10 flaps per hour) for the alternative path, then flap detector 510 may prevent QoS evaluation process 248 from rerouting traffic onto that alternative path that exhibits such flapping behavior.

Figure 9:
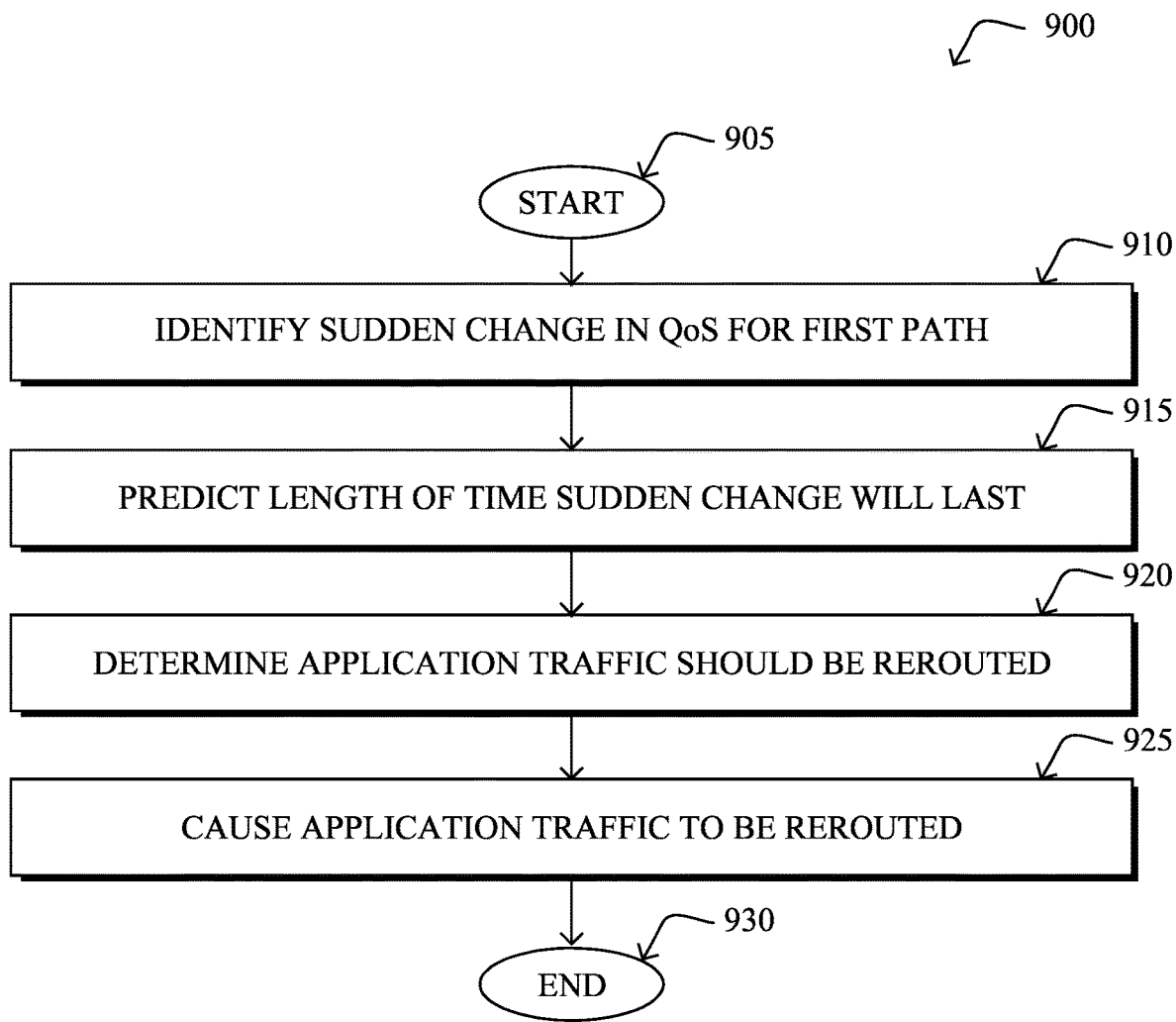
FIG. 9 illustrates an example simplified procedure to evaluate the QoS of a network path.

FIG. 9 illustrates an example simplified procedure for estimating the QoE of an application, in accordance with one or more embodiments described herein. For example, a non-generic, specifically configured device (e.g., device 200), such as a networking device (e.g., a router, an SDN controller for an SD-WAN, etc.), or a device in communication therewith, may perform procedure 900 by executing stored instructions (e.g., QoS evaluation process 248 and/or routing process 244). The procedure 900 may start at step 905, and continues to step 910, where, as described in greater detail above, the device may identify a sudden change in a time series of a quality of service (QoS) metric for a first path in a network that violates a service level agreement threshold associated with application traffic conveyed via the first path. For instance, such a QoS metric may be the packet loss, latency, jitter, or the like, for the first path (e.g., an SD-WAN tunnel, etc.). In various embodiments, the device may base this identification in part on a parameter associated with the application traffic that controls whether the application traffic should be rerouted when a sudden change in the quality of service of the first path occurs or when an average of the quality of service metric over time violates the service level agreement threshold. In other words, the assessment of sudden QoS changes for a certain type of application traffic may be configurable, with another option being to rely on a (slower) approach, such as triggering rerouting based on an average of the QoS metric over time. In further embodiments, the device may make the identification by using change point detection on the time series, such as based on a specified minimum peak height and/or width parameter.

At step 915, as detailed above, the device may predict a length of time that the sudden change in the time series will last. In one embodiment, the device may do so using a statistical model and based on a conditional probability that the time series will last longer than a predefined threshold. In another embodiment, the device may use a regression or other machine learning model to make the prediction.

At step 920, the device may determine, based in part on the predicted length of time, that the application traffic should be rerouted onto a second path in the network, as described in greater detail above. In some embodiments, the device may opt to reroute the traffic if the predicted length of time exceeds a threshold set for the application type associated with the traffic. In further embodiments, the device may base the rerouting decision based in part on a determination that the second path will not exhibit flapping behavior with respect to the SLA threshold. In yet another embodiment, the device may base the decision to reroute the application traffic based in part on a prediction that the QoS metric for the second path will not violate the SLA threshold of the application traffic.

At step 925, as detailed above, the device may cause the application traffic to be rerouted onto the second path in the network. In some embodiments, the device may also continue to monitor the amount of time that the sudden change in the time series actually lasted. In turn, the device may adjust how it detects sudden QoS changes, such as by adjusting the minimum peak height or width parameter for the detection, based on this monitoring. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allows for the evaluation of QoS on network paths so as to identify sudden changes to the QoS and initiate rerouting. In some aspects, the techniques herein may dynamically adjust the criteria that it uses to identify a sudden QoS change and initiate rerouting. In further aspects, the techniques herein may also take into account the probability that the new path will also violate the SLA of the rerouted traffic and/or exhibit SLA flapping behavior.

While there have been shown and described illustrative embodiments that provide for evaluating path QoS in a network, it is to be understood that various other adaptations and modifications may be made within the spirit and scope of the embodiments herein. For example, while certain embodiments are described herein with respect to using certain models for purposes of predicting SLA violations, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
identifying, by a device, a sudden change in a time series of a quality of service metric for a first path in a network that violates a service level agreement threshold associated with application traffic conveyed via the first path;
predicting, by a device, a length of time that the sudden change in the time series will last;
determining, by the device and based in part on the length of time that the sudden change in the time series is predicted to last exceeding a threshold amount of time set for an application type associated with the application traffic, that the application traffic should be rerouted onto a second path in the network; and
causing, by the device, the application traffic to be rerouted onto the second path in the network.

2. The method as in claim 1, wherein the network comprises a software-defined wide area network and wherein the first path or the second path comprises a network tunnel.

3. The method as in claim 1, wherein the quality of service metric comprises one of: packet loss, latency, or jitter.

4. The method as in claim 1, wherein the device identifies the sudden change in the time series based in part on a parameter associated with the application traffic that controls whether the application traffic should be rerouted when a sudden change in the quality of service of the first path occurs or when an average of the quality of service metric over time violates the service level agreement threshold.

5. The method as in claim 1, wherein identifying the sudden change in the time series comprises:
determining whether the sudden change in the time series exhibits a minimum peak height or width.

6. The method as in claim 5, further comprising:
adjusting, by the device, the minimum peak height or width, based in part on an amount of time that the sudden change in the time series actually lasted.

7. The method as in claim 1, wherein the device predicts the length of time that the sudden change in the time series will last based on a conditional probability that the sudden change in the time series will last longer than a predefined threshold.

8. The method as in claim 1, wherein the device predicts the length of time that the sudden change in the time series will last using a regression model.

9. The method as in claim 1, wherein determining that the application traffic should be rerouted onto the second path in the network comprises:
determining whether the quality of service metric for the second path in the network is likely to exhibit flapping behavior with respect to the service level agreement threshold.

10. The method as in claim 1, wherein determining that the application traffic should be rerouted onto the second path in the network comprises:
predicting that the quality of service metric for the second path in the network will not violate the service level agreement threshold.

11. An apparatus, comprising:
one or more network interfaces;
a processor coupled to the one or more network interfaces and configured to execute one or more processes; and
a memory configured to store a process that is executable by the processor, the process when executed configured to:
identify a sudden change in a time series of a quality of service metric for a first path in a network that violates a service level agreement threshold associated with application traffic conveyed via the first path;
predict a length of time that the sudden change in the time series will last;
determine, based in part on the length of time that the sudden change in the time series is predicted to last exceeding a threshold amount of time set for an application type associated with the application traffic, that the application traffic should be rerouted onto a second path in the network; and
cause the application traffic to be rerouted onto the second path in the network.

12. The apparatus as in claim 11, wherein the network comprises a software-defined wide area network and wherein the first path or the second path comprises a network tunnel.

13. The apparatus as in claim 12, wherein the apparatus comprises an edge router or controller of the software-defined wide area network.

14. The apparatus as in claim 11, wherein the apparatus identifies the sudden change in the time series based in part on a parameter associated with the application traffic that controls whether the application traffic should be rerouted when a sudden change in the quality of service of the first path occurs or when an average of the quality of service metric over time violates the service level agreement threshold.

15. The apparatus as in claim 11, wherein the apparatus identifies the sudden change in the time series by:
determining whether the sudden change in the time series exhibits a minimum peak height or width.

16. The apparatus as in claim 15, wherein the process when executed is further configured to:
adjust the minimum peak height or width, based in part on an amount of time that the sudden change in the time series actually lasted.

17. The apparatus as in claim 11, wherein the apparatus predicts the length of time that the sudden change in the time series will last based on a conditional probability that the sudden change in the time series will last longer than a predefined threshold.

18. The apparatus as in claim 11, wherein the apparatus predicts the length of time that the sudden change in the time series will last using a regression model.

19. The apparatus as in claim 11, wherein the apparatus determines that the application traffic should be rerouted onto the second path in the network by:
  determining whether the quality of service metric for the second path in the network is likely to exhibit flapping behavior with respect to the service level agreement threshold.

20. A tangible, non-transitory, computer-readable medium storing program instructions that cause a device to execute a process comprising:
  identifying, by the device, a sudden change in a time series of a quality of service metric for a first path in a network that violates a service level agreement threshold associated with application traffic conveyed via the first path;
  predicting, by a device, a length of time that the sudden change in the time series will last;
  determining, by the device and based in part on the length of time that the sudden change in the time series is predicted to last exceeding a threshold amount of time set for an application type associated with the application traffic, that the application traffic should be rerouted onto a second path in the network; and
  causing, by the device, the application traffic to be rerouted onto the second path in the network.

\* \* \* \* \*

UNITED STATES PATENT AND TRADEMARK OFFICE
CERTIFICATE OF CORRECTION

PATENT NO. : 11,463,365 B1
APPLICATION NO. : 17/150525
DATED : October 4, 2022
INVENTOR(S) : Jean-Philippe Vasseur It is certified that error appears in the above-identified patent and that said Letters Patent is hereby corrected as shown below:

In the Specification

Column 1, Line 24, please amend as shown:
In SD-WANs, packets are routed on a secondary path if Column 7, Line 61, please amend as shown:
e.g., ADSL,4G, 5G, etc.) in all cases, as well as various Column 8, Line 7, please amend as shown:
core 402 and SD-WAN fabric 404. For instance, SD-WAN Column 12, Line 2, please amend as shown:
onto that path. For instance, RCE 502 may assess the results Column 13, Line 12, please amend as shown:
of change. Finally, QCD 504 may returns a set of change Column 13, Line 27, please amend as shown:
702 in time series 700, QCD 504 may take as input the Signed and Sealed this
Third Day of January, 2023

Katherine Kelly Vidal
*Director of the United States Patent and Trademark Office*